UNITED STATES PATENT OFFICE.

RICHARD S. DILLON, OF DETROIT, MICHIGAN.

IMPROVEMENT IN REFINING IRON.

Specification forming part of Letters Patent No. 152,617, dated June 30, 1874; application filed March 24, 1874.

*To all whom it may concern:*

Be it known that I, RICHARD S. DILLON, of Detroit, in the county of Wayne and State of Michigan, have invented an Improved Process for Desulphurizing and Dephosphorizing Iron, of which the following is a specification:

My invention has for its object to eliminate sulphur and phosphorus from iron, either in the smelting of the ore or in any subsequent process of melting the pig-metal; and to this end it consists in generating chlorine gas at or near the melting-zone of the blast-furnace stack, or in the foundry-cupola. The cheapest and most available material for this purpose is the chloride of sodium, (common salt,) although any other chloride may be employed. But if such chloride be used singly and directly, it will be attended with considerable waste, and without perfectly accomplishing the desired result.

The most economical and effectual way of conducting the process is to combine the chloride with the hydrate of lime and common clay, or either of them, making a compound in the nature of a flux, which is charged into the stack or cupola between alternate charges of iron ore or pig-metal.

Take of well-burned lime, slaked with water, two parts, and add thereto one part of chloride of sodium; stir in enough common clay puddled thin with water to bring the mass to the consistency of bricklayers' mortar. When the foundry-cupola is fired up and ready for the iron, I charge in one-third of a ton of pig-metal, and pour over it about fifty pounds of the chloride compound. I charge in another third of a ton of metal and pour over it the same quantity of the compound, followed by the remaining third of the first ton of metal, with a like quantity (fifty pounds) of the compound, proceeding to charge the cupola in this way, but gradually reducing the quantity of the chloride compound interjected between the charges, so that it will average about one hundred pounds per ton of pig-metal charged in during the heat. Chlorine gas is evolved from this compound at a temperature below that of the melting-point of iron, which gas, combining with the sulphur and phosphorus at the melting-zone of the cupola, carries them off, as it is well known that both sulphur and phosphorus have a strong affinity for chlorine gas. That part of the chloride of sodium which, by the action of the heat in the stack or cupola, may form soda, will go into the cinder or slag, and assist in cleansing the iron of any earthy substances that may be in it.

I subjoin two tables, showing the result of the application of this process in refining some pig-metal carrying such high percentages of sulphur and phosphorus as to render it valueless for commercial purposes—both tables being given from accurate analysis.

Table I shows the percentages of sulphur and phosphorus in the raw pig-metal, and their respective proportions in a ton of two thousand pounds.

TABLE I.

| | Phosphorus. | Sulphur. |
|---|---|---|
| Per 100 pounds | 0.32270 per cent. | 0.38900 per cent. |
| Per 2,000 pounds | 6.4540 pounds. | 7.7800 pounds. |

Table II shows, from accurate analysis, the result of the process in the treatment of the metal of which Table I is an analysis.

TABLE II.

| | Phosphorus. | Sulphur. |
|---|---|---|
| Per 100 pounds | 0.03749 per cent. | 0.015680 per cent. |
| Per 2,000 pounds | 0.7498 pounds. | 0.313600 pounds. |

It will readily be seen from the above analyses that the large proportion of phosphorus and sulphur found in the iron has been eliminated, and that but a bare trace has been left.

I am aware that salt and other chlorides have been used for the same purposes, but always in a dry state, so that when the blast was applied the salt or chlorides were liable to be blown out of the stack before being sufficiently heated to throw off or generate chlorine gas. I mix the compound as above described in order to apply it in a plastic state, and the steam is thrown off while the metal is being heated to the necessary degree to throw off the sulphur and phosphorus. At this stage the chlorine gas is generated, (such generation having been retarded by the heat being first compelled to dry the compound,) and, mingling with the steam, carries off the gases of the sulphur and phosphorus. This compound, being in a plastic state, also retards the injurious gases until the heat cracks the compound and generates the chlorine gas, when the injurious gases, mingling with the chlorine gases, pass off with it. I do not desire to confine myself to the use of clay for stiffening this compound, as any neutral earth will produce the same result.

What I claim as my invention, and desire to secure by Letters Patent, is—

The combination of chloride of soda, hydrate of lime, and common clay, in the proportions designated, and for the purposes set forth.

RICHARD S. DILLON.

Witnesses:
H. S. SPRAGUE,
C. E. HUESTIS.